(12) United States Patent
Orth et al.

(10) Patent No.: US 11,941,456 B2
(45) Date of Patent: *Mar. 26, 2024

(54) COMPUTER SYSTEM WORKLOAD MANAGER

(71) Applicant: International Business Machines Corporation, Armonk, NY (US)

(72) Inventors: Tobias Orth, Boeblingen (DE); Dieter Wellerdiek, Ammerbuch (DE); Norman C. Böwing, Böblingen (DE); Qais Noorshams, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 363 days.

This patent is subject to a terminal disclaimer.

(21) Appl. No.: 17/348,668

(22) Filed: Jun. 15, 2021

(65) Prior Publication Data

US 2021/0311806 A1      Oct. 7, 2021

Related U.S. Application Data

(63) Continuation of application No. 16/101,972, filed on Aug. 13, 2018, now Pat. No. 11,061,740.

(51) Int. Cl.
  *G06F 9/50* (2006.01)
  *G06F 11/34* (2006.01)
(52) U.S. Cl.
  CPC .......... *G06F 9/5083* (2013.01); *G06F 9/505* (2013.01); *G06F 11/3419* (2013.01); *G06F 11/3452* (2013.01)

(58) Field of Classification Search
  CPC .... G06F 9/5083; G06F 9/505; G06F 11/3419; G06F 11/3452
  See application file for complete search history.

(56) References Cited

U.S. PATENT DOCUMENTS 7,228,546 B1   6/2007   McCarthy
8,312,460 B1   11/2012  Blanding
(Continued)

OTHER PUBLICATIONS

Al-Ghamdi, et al., "Proactive Workload Forecasting Model with Dynamic Resource Allocation for Modern Internet Application", 2014 IEEE/ACM 7th International Conference on Utility and Cloud Computing, pp. 396-403.

(Continued)

*Primary Examiner* — Jacob D Dascomb
(74) *Attorney, Agent, or Firm* — Grant M. McNeilly

(57) ABSTRACT

A computer-implemented method includes storing usage of a resource of said computer system as time-stamped resource usage values, comparing said time-stamped resource usage values with predetermined time-stamped performance goal values, assigning a time-stamped priority value to an application that is running based on at least one of said performance goal values, identifying a future workload demand value by applying a time-series analysis algorithm to at least some of said time-stamped resource usage (Continued)

values and a corresponding at least some of said time-stamped performance goal values for said application resulting in workload demand time frames and related amplitudes of said workload demand time frames, and adjusting a dispatch priority value for said application by setting a minimum dispatch priority for said application based on said future workload demand value.

20 Claims, 9 Drawing Sheets

(56) References Cited

U.S. PATENT DOCUMENTS

| | | | |
|---|---|---|---|
| 8,417,814 B1* | 4/2013 | Hartmann | G06F 9/5011 |
| | | | 709/225 |
| 2008/0059968 A1 | 3/2008 | Cascaval | |
| 2009/0119673 A1 | 5/2009 | Bubba | |
| 2010/0131959 A1 | 5/2010 | Spiers | |
| 2012/0265881 A1 | 10/2012 | Chen | |
| 2017/0206103 A1* | 7/2017 | Arndt | G06F 9/45533 |
| 2019/0370085 A1* | 12/2019 | Gross | G06F 1/3206 |
| 2020/0050530 A1 | 2/2020 | Orth | |

OTHER PUBLICATIONS

Bobroff, et al., "Dynamic placement of virtual machines for managing SLA violations." In Proceedings of the 10th IFIP/IEEE International Symposium on Integrated Network Management (IM), 2007, 10 pages.

Cleveland, et al., "STL: A Seasonal-Trend Decomposition Procedure Based on Loess", Journal of Official Statistics, vol. 6 No. 1, 1990, pp. 1-33.

List of IBM Patents or Patent Applications Treated as Related, Jun. 15, 2021, 2 pages.

Roy, et al., "Keep It Moving: Proactive workload management for reducing SLA violations in large scale SaaS clouds", 2013 IEEE 24th International Symposium on Software Reliability Engineering (ISSRE), Nov. 4-7, 2013, pp. 421-430.

Vaupel, Robert, "High Availability and Scalability of Mainframe Environments using System z and z/OS as example", KIT Scientific Publishing 2013, 346 pages.

Xue, et al., "Dynamic Resource Allocation in Enterprise Systems", 2008 14th IEEE International Conference on Parallel and Distributed Systems, pp. 203-212.

Zhang, et al., "Intelligent Workload Factoring for A Hybrid Cloud Computing Model", 2009 Congress on Services-I, pp. 701-708.

Zhang, et al., "Proactive Workload Management in Hybrid Cloud Computing", IEEE Transactions on Network and Service Management, vol. 11, No. 1, Mar. 2014, pp. 90-100.

* cited by examiner

COMPUTER SYSTEM WORKLOAD MANAGER

BACKGROUND

The disclosure relates generally to a method for enhancing a workload manager for a computer system, and more specifically, to a method for enhancing a workload manager for a computer having limited resources. The disclosure relates further to a system for enhancing a workload manager for a computer having limited resources, and a computer program product for enhancing a workload manager for a computer having limited resources.

On the single computer system only, a limited amount of resources (e.g., CPU and storage) exist. These resources need to be shared by all tasks running on the system. A workload manager (WLM) in the operating system is responsible for dividing the available resources between the running tasks and/or applications. Some tasks may be more important than others and a WLM may honor this importance by granting the more important tasks more access to resources than other tasks. It may occur that not all tasks are running satisfactorily because the WLM cannot meet the resource demand for these tasks.

Given a non-volatile workload pattern (e.g., in a large-scale computing system in particular) and enough time, a reactive workload management system will bring the system to a stable state in which every workload is able to meet its goal. However, an operating system with reactive workload management will react slowly to sudden changes in the workload pattern because it can only react on the observed impact of the workload change (e.g., demand for a workload rises, but the CPU resources are not enough to still satisfy its goals). It may take time for the operating system to adapt to the new workload demand and for the system to reach a stable state again. The operating system, together with a workload manager, changes its behavior slowly because it uses recently-sampled data, which will reflect whether a workload has been waiting for access to resources. The sample data will be read by the workload management system, but the impact of newly read samples require some time before an access to resources is adjusted to avoid overreacting.

A lot of changes in workload patterns can be traced back to specific events (e.g., the opening of the stock market at a certain hour each workday). These changes could be anticipated by a manual intervention to the workload management system, although there are significant disadvantages to using manual intervention to mitigate or remediate such issues.

SUMMARY

According to one aspect of the present disclosure, a computer-implemented method includes storing usage of a resource of said computer system as time-stamped resource usage values, comparing said time-stamped resource usage values with predetermined time-stamped performance goal values, assigning a time-stamped priority value to an application that is running based on at least one of said performance goal values, identifying a future workload demand value by applying a time-series analysis algorithm to at least some of said time-stamped resource usage values and a corresponding at least some of said time-stamped performance goal values for said application resulting in workload demand time frames and related amplitudes of said workload demand time frames, and adjusting a dispatch priority value for said application by setting a minimum dispatch priority for said application based on said future workload demand value.

According to one aspect of the present disclosure, a computer system includes one or more processing devices configured to execute program data for the workload manager system, and one or more memory devices communicatively and operably coupled to the one or more processing devices, the one or more memory devices storing a storing module, a comparison unit, an assignment unit, an identification module, and an adjustment unit. The program data configures the storage module to store a usage of a resource of said computer system as time-stamped resource usage values, the comparison unit to compare said time-stamped resource usage values with predetermined time-stamped performance goal values, the assignment unit to assign a time-stamped priority value to an application that is running based on at least one of said time-stamped performance goal values, the identification module to identify a future workload demand value by applying a time-series analysis algorithm to at least some of said time-stamped resource usage values and a corresponding at least some of said time-stamped performance goal values for said application resulting in workload demand time frames and related amplitudes of said workload demand time frames, and the adjustment module to adjust a dispatch priority value for said application by setting a minimum dispatch priority value for said application based on said future workload demand value.

According to one aspect of the present disclosure, a computer program product for enhancing a workload manager for a computer having limited resources, said computer program product comprising a computer readable storage medium having program instructions embodied therewith, said program instructions being executable by one or more computing systems or controllers to cause said one or more computing systems to store a usage of a resource of said computer system as time-stamped resource usage values, compare said time-stamped resource usage values with predetermined time-stamped performance goal values, assign a time-stamped priority value to an application that is running based on at least one of said time-stamped performance goal values, identify a future workload demand value by applying a time-series analysis algorithm to at least some of said time-stamped resource usage values and a corresponding at least some of said time-stamped performance goal values for said application resulting in workload demand time frames and related amplitudes of workload demand time frames, and adjusting a dispatch priority value for said application by setting a minimum dispatch priority value for said application based on said future workload demand value.

BRIEF DESCRIPTION OF THE DRAWINGS

It should be noted that embodiments of the disclosure are described with reference to different subject matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject matters, in particular, between features of the method type claims and features of the apparatus type claims, is considered as to be disclosed within this document.

The aspects of the present disclosure are apparent from the examples of embodiments to be described hereinafter and are explained with reference to the examples of embodiments, but which are not intended to be limiting. Some embodiments of the disclosure will be described, by way of example only, and with reference to the following drawings.

DETAILED DESCRIPTION

Discussion of Some Definitions

Figure 1:
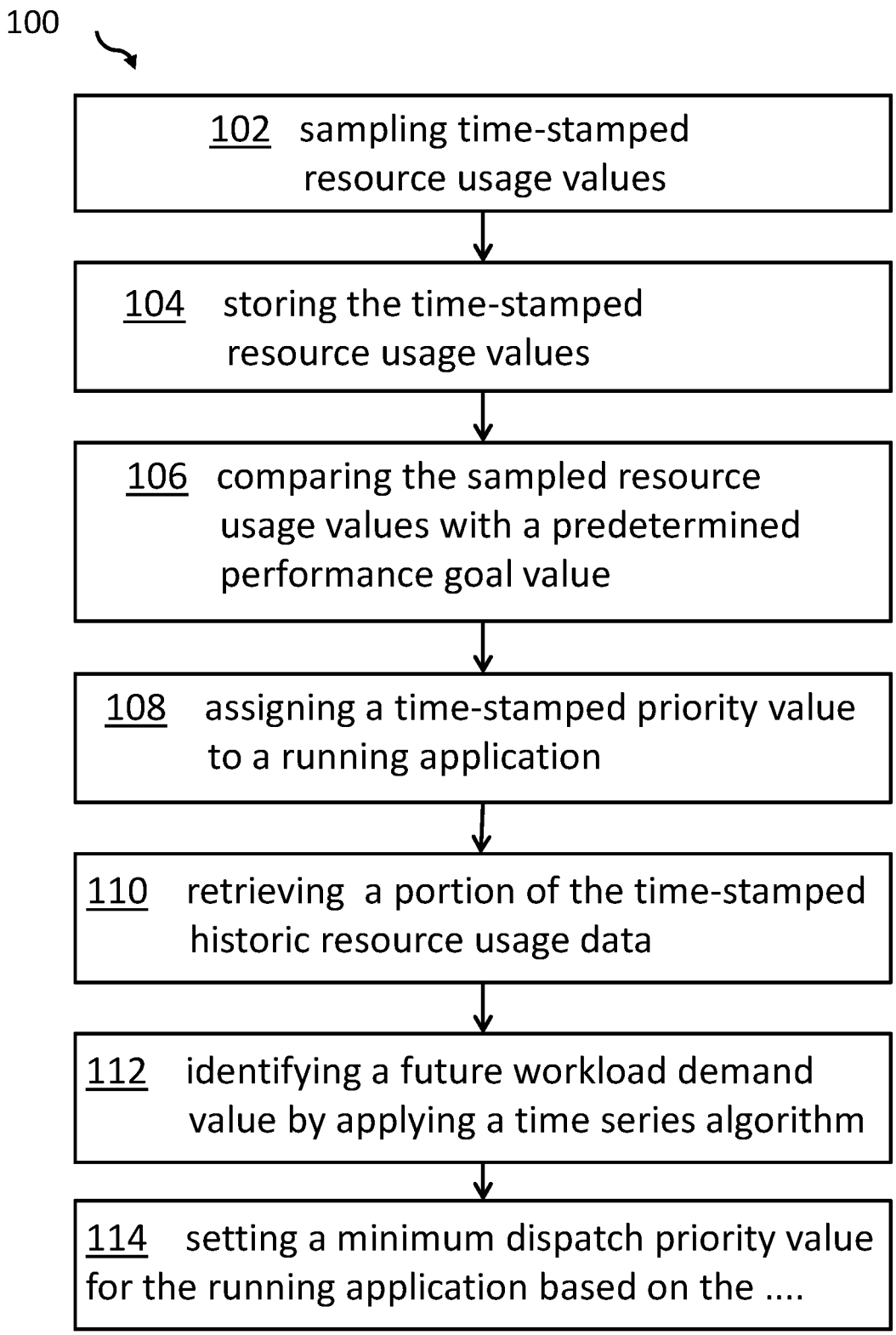
FIG. 1 shows a flow chart of an embodiment of a method for enhancing a workload manager for a computer having limited resources.

In the context of this description, the following conventions, terms and/or expressions may be used:

The term 'workload manager' denotes a component in a multi-user operating system (like IBM z/OS). The workload manager may control the access to system resources for the work being executed on the operating system based on operator-defined goals.

The term 'resources' denotes any accessible component of a computer system which may be a constraint due to access by multiple programs. Here the term resources may in particular denote a central processing unit, an amount of main memory, an amount of cache memory, an amount of external storage capacity, a network capacity, and an input/output channel, in particular, its available capacity.

The term 'usage' denotes an access to a resource and the time related to the accessing the resource. In some cases, usage may also denote the percentage used of the resource (e.g. a channel capacity or the partial amount of a main memory).

The term 'time-series analysis' denotes the collection of statistical approaches and algorithms and/or the process of the application thereof applied to time-series data points to obtain metrics or other information describing the time-series data points and/or to obtain models enabling to forecast the time-series data points into the future (e.g., to predict unobserved future time-series data points based on the observed historic time-series data points with sufficient confidence).

The term 'service class' (SC) denotes a set of characteristics for workloads being executed on a computer system. In particular, applications may be grouped into distinct service classes in order to assign group-wide service parameters to them. Typically, applications of the same service class share a common set of requirements (e.g., either resource requirements or service level requirements).

Discussion of Some Benefits and Advantages

The proposed method for enhancing a workload manager for a computer having limited resources may offer multiple advantages and technical effects, for example:

Generally, the workload management process—in particular for large scale computing systems—may be improved. The present disclosure presents an elegant method to modify the existing, reactive workload management process to create a new workload management process that can manage incoming future workloads proactively. The traditional slowness to adapt to a dynamically changing workload can be overcome using the teachings of the present disclosure. The sampling and storing of time-stamped resource usage data to forecast a future demand of workloads before the time they actually hit the computing system can smoothen out future resource demand peaks to which the computing system itself could only react to slowly.

As set forth in the present disclosure, the existing and comparably slow process of rebalancing workload demands and access to available resources in large-scale computing systems can be tuned such that future increased resource demands for certain workloads may be anticipated based on an analysis—in particular the mentioned time-series analysis—of earlier sampled and stored resource usage data.

In some embodiments, the resource usage data will be stored for a comparably long time, such as for days, weeks, months, or also years. In such embodiments, a comparably precise prediction of future workloads can be made and so that the system can adapt the dispatch priority for workloads in a more dynamic and forward-looking way, so as to balance out traditionally unexpected resource demand peaks. In other words, the dispatch priority of a workload being expected to demand a certain resource in the near future will be increased just before the higher demand may hit the resource. Thereby, surprises are taken out of the workload management system. As trigger, a gradient of the workload increase may be used. Additionally, the protection time may also guarantee that no other dispatch prioritization mechanics may destroy the advantageous demand forecasting effect provided by some embodiments described herein.

An additional benefit lies in the improved performance for important workloads for example, online transaction workloads, which can have their workload management forecasted. Reaction times for changes in workload demands may be reduced significantly using the forecasting process and proactive adjustments. Service level objective (SLO) violations of important workloads may be reduced due to the timely adjustment of resources. For example: When the stock market opens, and the workload management system has already adjusted the dispatch priority by taking the upcoming trading workload into account. No delay in rebalancing the workload will happen. The same advantage may be achieved in a classical banking environment. If it is known that the peak hours are, for example, between 9:00 and 12:00 as well as 13:00 to 16:00, some embodiments of the present disclosure may ensure that the workload will be rebalanced at the very beginning of the peak periods.

Discussion of Some Embodiments

According to an aspect of the present disclosure, a method for enhancing a workload manager for a computer having limited resources may be provided. The method may comprise sampling and storing a usage of a resource of the computer system as time-stamped resource usage values, comparing the sampled resource usage values with a predetermined performance goal value, and assigning a time-stamped priority value to a running application based on the performance goal value by the workload manager.

Furthermore, the method may comprise retrieving a portion of the time-stamped historic resource usage data and a related portion of historic time-stamped performance goal values for the application, identifying a future workload demand value by applying a time-series analysis algorithm to the time-stamped historic resource usage data and the historic time-stamped performance goal values for the application resulting in workload demand time frames and related amplitudes of workloads, and adjusting a dispatch priority value for the application by setting a minimum dispatch priority value for the running application based on the identified future workload demand.

According to another aspect of the present disclosure, a system for enhancing a workload manager for a computer having limited resources may be provided. The system may comprise a sampling module adapted for sampling a usage of a resource of the computer system as time-stamped resource usage values, a comparison unit adapted for comparing the sampled resource usage with a predetermined performance goal value, and an assignment unit adapted for assigning a time-stamped priority value to a running application based on the performance goal value.

Additionally, the system may comprise a retrieving unit adapted for retrieving a portion of the time-stamped historic resource usage data and a related portion of historic time-stamped performance goal values for the application, an identification module adapted for identifying a future workload demand value by applying a time-series analysis algorithm to the time-stamped historic resource usage data and the historic time-stamped performance goal values for the application resulting in workload demand time frames and related amplitudes of workloads based, and an adjustment unit adapted for adjusting a dispatch priority value for the application by setting a minimum dispatch priority value for the running application based on the identified future workload demand.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating, or transporting the program for use by, or in connection with, the instruction execution system, apparatus, or device.

In the following, additional embodiments—also applicable to the related system—will be described:

According to some embodiments of the method, a time period for the time-stamped historic resource usage data values may be selected out of the group comprising a millisecond, a second, a minute, an hour, a day, a week, a month, a year, several years (e.g., two, three, four, five, or six years). Basically, any or every time period may be chosen. It may also be considered to optimize the resource usage (e.g., disk/memory) space to store the time-stamped resource usage data values in comparison to the accuracy of the applied time-series based method.

According to some embodiments, the method may also comprise applying weighting factors to the time-stamped historic resource usage data values for different time periods (e.g., one option may be to use lower weighting factors for older resource usage data if compared to newer resource usage data). For example, resource usage data being five years old may be less important than resource usage data from the same time period a year ago or just a month ago. The weighting factors may be controlled manually or determined automatically.

According to some embodiments of the method, the adjusting of the dispatch priority value may also comprise determining periodically, based on the identified future workload demand (in particular by comparing) an exceeding of a workload threshold growth value, and by setting the minimum dispatch priority value only if the workload threshold growth value is exceeded. Thus, setting the minimum dispatch priority may be based on a mathematical/logical formula of comparing calculated values (e.g., the identified future workload demand value) with measured, dynamically changing data (e.g., the workload threshold growth values).

According to some embodiments of the method, the adjusting the dispatch priority value may also comprise setting a minimum dispatch priority value which is not to be undercut by the dispatch priority value for a fixed period of time. This is not to say that the minimum dispatch priority value will be set in a way that no undercut of the active, dynamically determined dispatch priority value is expected to happen. In contrast, the minimum dispatch priority value will be the lower limit for the dynamically determined dispatch priority value. If the dispatch priority value is determined to be lower than the minimum dispatch priority value during the fixed time period, the dynamically determined to dispatch priority value will not be reduced under the limit of the minimum dispatch priority value. Thus, a certain service class (in particular, a specific application) may be excluded from a decrease in the dispatch priority during the fixed period of time.

According to some embodiments of the method, the running application, the resource usage values and the predetermined performance goal value may relate each to a service class that the running application relates to. Thus, the workload management does not need to be managed on an application level but can be managed for a group of applications, for example, a service class.

According to some embodiments, the method may also comprise defining an importance value $I_{app}$ of the application, for example, by a particular user and/or system. As an example, the importance value $I_{app}$ may be related to a service class and may range from, for example, 1 to 5. In other embodiments, other values are also possible.

According to some embodiments of the method, the adjusting the dispatch priority may also comprise adjusting a target importance value $I_{target}$—in particular for an application or service class—according to the following values:
if $I_{app}=1$, then $I_{target}=1$, and
if $I_{app}>1$, then $I_{target}=I_{app}-1$.
Wherein, $I_{app}$ may be the current importance value of the application and/or service class, respectively. This case decision may reflect that a value of "1" may represent the highest importance. In case the importance value has not yet reached the highest value, the importance value is decreased, meaning that the importance grows.

According some embodiments of the method, the adjusting the dispatch priority DP may also comprise adjusting a target dispatch priority $DP_{target}$ according to
if $I_{target}=1$, then $DP_{target}=maxDP\ (I_{target})+1$, and
if $I_{target}>1$, then $DP_{target}=avgDP\ (I_{target})+1$.

Wherein, maxDP is a maximum dispatch priority assignable to the application (service class, respectively), and avgDP is an average dispatch priority assignable to the application (service class, respectively).

This way the dynamically determined dispatch priority DP depends on the dynamically changing importance value I and is directly influenced by it. This may allow a fine-tuned forward-looking anticipated future workload adaptation based on the identified future workload demand.

According to some embodiments of the method, the resource may comprise at least one selected out of the group comprising, a central processing unit, an amount of main memory, an amount of cache memory, an amount of external storage capacity, a network capacity, and an input/output channel, in particular, its available capacity. Hence, any trackable resource of a large-scale computing system (and also smaller ones) may be supervised according to the present disclosure as long as resource usage data may be sampled and stored.

Discussion of the Figures

In the following, a detailed description of the figures will be given. All instructions in the figures are schematic. Firstly, a block diagram of an embodiment of the inventive method for enhancing a workload manager for a computer having limited resources is given. Afterwards, further embodiments, as well as embodiments of the system for enhancing a workload manager for a computer having limited resources, will be described.

FIG. 1 shows a block diagram of an embodiment of the computer-implemented method 100 for enhancing a workload manager (for example, an existing WLM) for a computer having limited resources. The method 100 comprises sampling, 102, and storing, 104, (which may be process known as logging of data) a usage of a resource of the computer system as time-stamped resource usage values.

Additionally, the method 100 comprises comparing, 106, the sampled resource usage values, which are a measure of a usage of a specific resource with a predetermined performance goal value. The predefined performance goal may, for example, define a minimum number of transactions per time-period, a transmission speed over a communication line, a memory bandwidth, or similar.

Furthermore, the method 100 comprises assigning, 108, a time-stamped priority value to a running application based on the performance goal value by the workload manager. This may also include a re-assigning a priority value in a dynamic environment. A skilled person will understand that this can be done for every executing application or service class comprising a plurality of different applications.

Furthermore, the method 100 comprises retrieving, 110, a portion or all of the time-stamped historic resource usage data and a related portion or entirety of historic time-stamped performance goal values for the application. This may require a retrieval of historic resource usage data outside the scope of a short-term (e.g., seconds) time-wise local optimization time period.

Instead, some embodiments use an analysis of resource usage data for a long period of time, such as days, weeks, months and/or years. This may be seen as fundamentally different to a time-wise local optimization approach. It may also use different analysis tools, like the mentioned time-series analysis of the historic resource usage data.

The method 100 then also comprises identifying, 112, a future workload demand value by applying, for example, a time-series analysis algorithm to the time-stamped historic resource usage data and the historic time-stamped performance goal values for the application resulting in workload demand time frames and related amplitudes of workloads based, and adjusting, 114, a dispatch priority value for the application by setting a minimum dispatch priority value for the running application based on the identified future workload demand.

As already mentioned, different approaches for setting a minimum dispatch priority are possible. A simple approach would be to use an average value, a weighted average value, or an approach based on an importance value, and maxDP and/or avgDP, as already mentioned above.

Before detailing some embodiments of the present disclosure, an existing, prior art workload management architecture 200 and a basic related process will be described referring to FIG. 2. In an operating system with a reactive (traditional) workload manager (WLM) 202, the amount of resources available are considered to be fixed and limited. Users can define goals (needs) for specific workloads on a service class (SC) basis in a WLM policy 204, which the WLM 202 of the operating system (not shown) should satisfy (e.g., upper limit on response time).

In such a system, performance data of the system are periodically sampled (indicated by the partial circle 212) and written to log files 206 (system management facility (SMF) data). These data may range from the number of transactions and CPU utilization to system-dependent performance metrics. The data sampled are exemplified in table 214. A typical WLM 202 analyses the system state by calculating performance and/or health metrics for each service class (SC) to find service classes which do not meet their (for example, user-defined) goals. The WLM 202 defines one or more service classes to receive more access to resources by increasing, 208, the dispatch priority of the service class relating to a specific address space (AS) 210 (AS_ID=address space identifier). A service class with a higher dispatch priority (which is normally a higher number and is in contrast to a higher importance, which is normally represented by a lower number) will receive more access to CPU resources than a service class with a lower dispatch priority (DP). If service classes have the same dispatch priority, access to CPU resources is shared between them. These actions are also written to log files 206 (for example, a binary log file). Typical logged data comprise delay, dispatch priority used, performance index, etc.

Due to limited available resources, the WLM 202 must control access to the resources in order to satisfy the goals of each service class. for example, the WLM cannot allot all available CPU resources to only one service class, while still satisfying the goals of other service classes.

As already described, the WLM 202 dynamically adjusts, 208, the dispatch priority based on defined goals for service classes and available resources. The WLM 202 accesses the performance metrics of all service classes and compares them to their predefined performances in order to determine the ones which do not meet their goals. In a practical scenario with only service class SC_x (e.g., importance=2) and service class SC_y (e.g., importance=3), different cases for a dispatch priority adjustment exist.

The following may serve as an example: SC_x and SC_y do not achieve their predefined performance goals and the DP of SC_x is less than DP of SC_y. Now, the WLM identifies SC_x as the biggest bottleneck, because it has a higher importance than SC_y. SC_x is selected as receiver for resources and SC_y is selected as an only possible donor for resources to help SC_x reaching its defined goals. Therefore, WLM increases the DP of SC_x to be greater than the DP of SC_y. This results in SC_x getting more access to CPU resources because it has a higher DP in relation to the lower DP of SC_y. The system ensures that SC_x gets all the CPU resources it requests and SC_y gets the CPU resources not used by SC_x with DP_x>DP_y. In another example, if DP_x=DP_y, then CPU resources are shared equally between SC_x and SC_y.

Figure 2:
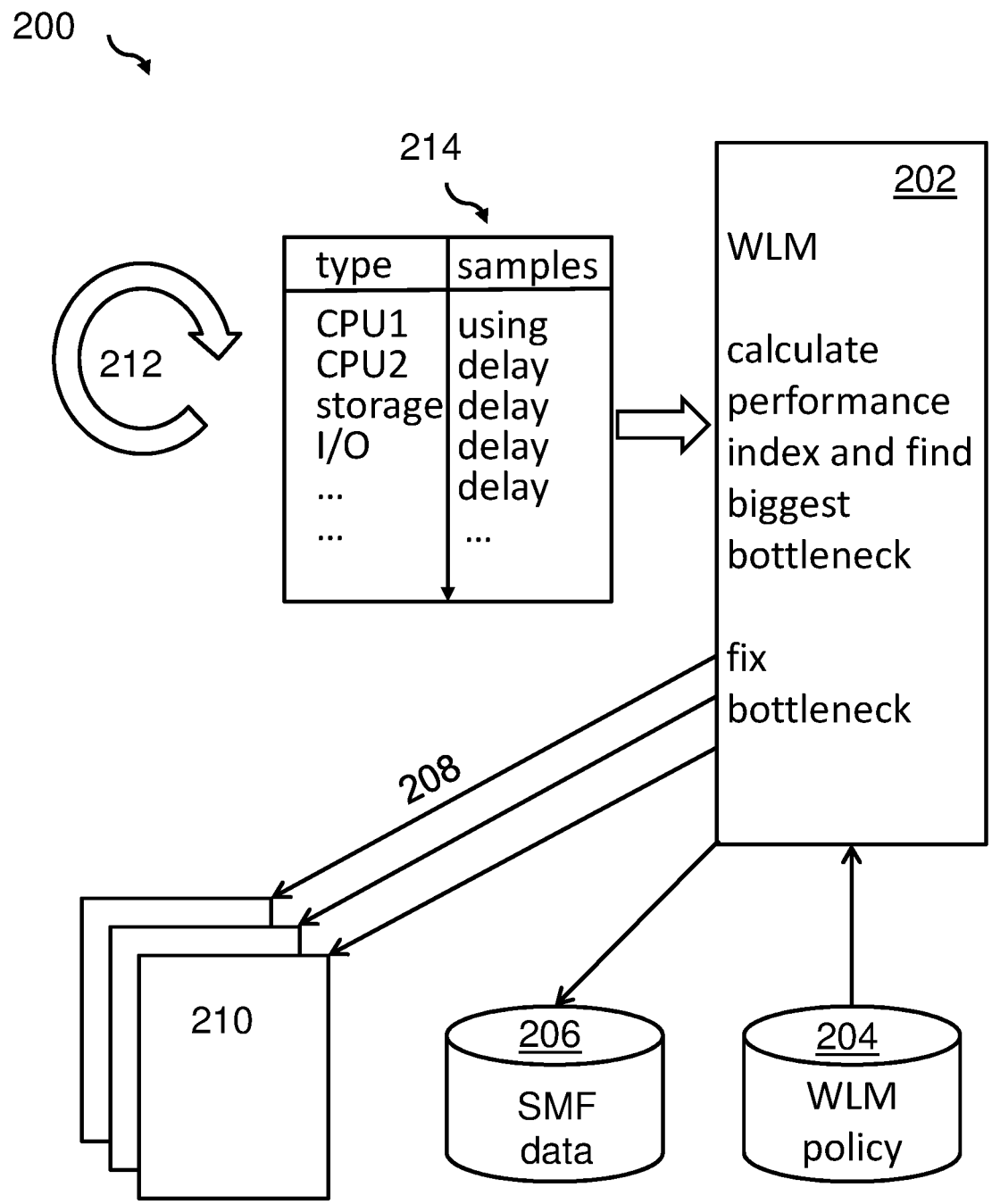
FIG. 2 shows a block diagram of a prior art workload management architecture.

In contrast to the prior art system of FIG. 2, a time-series analysis of workload demand forecasting of the present disclosure can be implemented. Next, the workload demand forecasting using time-series analysis will be described:

Enterprise workloads, especially online transaction workloads such as banking and trading workload, typically follow a cyclical pattern. For example: A typical workload for one day exhibits a high demand during the morning hours, which is followed by a significant decrease during the lunch hours, followed by a second rise after the lunch hours, finally leading to a steady decrease through the evening and night. This demand is obviously driven by the typical day of banking and trading customers. Other industries and related cyclical workload demands can also easily be derived.

The workload demand on the system, which simply speaking refers to, for example, the number of requests to the system by a user, can be modeled and thereby forecasted, using time-series analysis. Time-series analysis is a specialized statistical discipline, and a time-series is a set of data values in time (or chronological) order. Thus time-series data is a two-dimensional data set with time as the first dimension and the data value as the second dimension.

In some embodiments, the time-series analysis algorithm STL (STL being an acronym for seasonal and trend decomposition using Loess (local regression), proposed by Cleveland, Cleveland, McRae, and Terpenning, 1990) is exploited, although other analyses may be used in alternate embodiments. A time-series analysis algorithm STL can be characterized by a decomposition of a time-series into the three components: (i) a trend component, (ii) a seasonal component, and (iii) a remainder. The trend component describes whether the data generally rises or falls during the observation period. The seasonal component describes the cyclical aspect of the data. Finally, the remainder describes data that cannot be explained by the previous two components.

Figure 3:
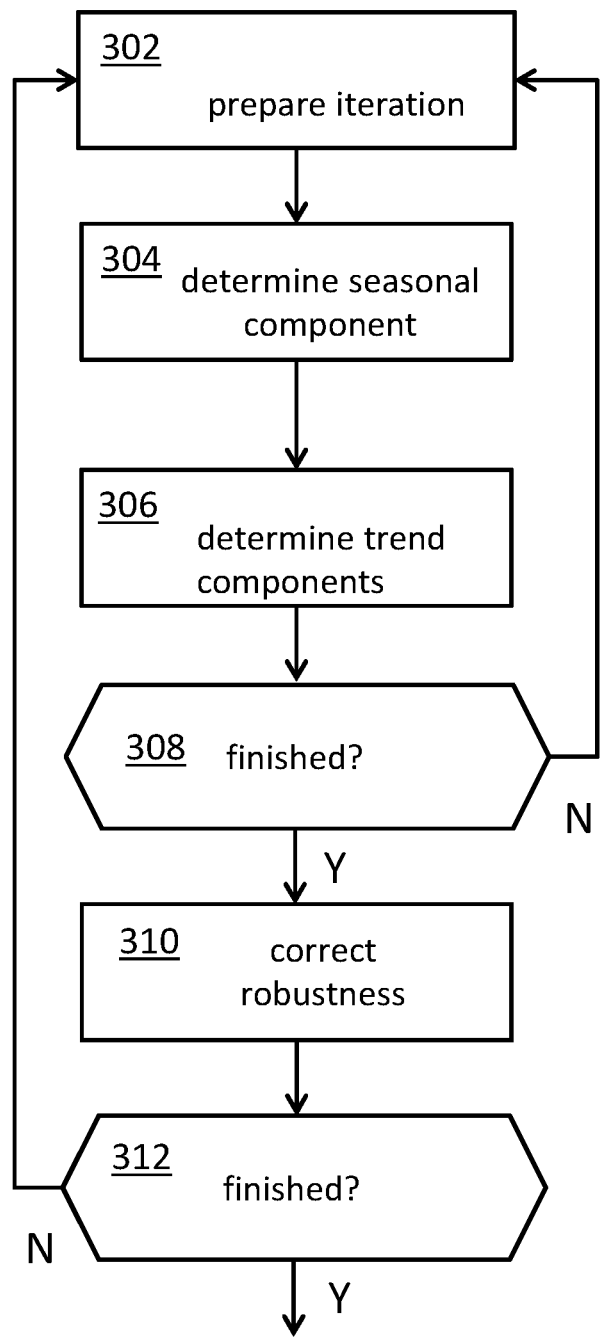
FIG. 3 shows a block diagram of a flowchart for an iterative time-series decomposition.

FIG. 3 shows a block diagram of a flowchart 300 for an iterative time-series decomposition. In the illustrated embodiment, the decomposition follows an iterative approach. To begin, the iteration is initialized and prepared, 302. Then the seasonal component is determined, 304, and the trend component is determined, 306, using at least one of a multitude of statistical approaches and smoothing techniques. Steps 302-306 may be repeated to refine the results if it is determined, 308, that the analysis to that point is not yet finished. Then, after the determination, 308, that the first part of the analysis is finished, the process continues with calculating, 310, robustness coefficients to account for significant outliers in the data that may distort the result. These robustness coefficients may be used to repeat the first part (e.g., steps 302-306) and to refine the seasonal and trend components iteratively. The complete process may then be repeated if it is determined, 312, that the analysis is not yet finished to refine the results.

Figure 4:
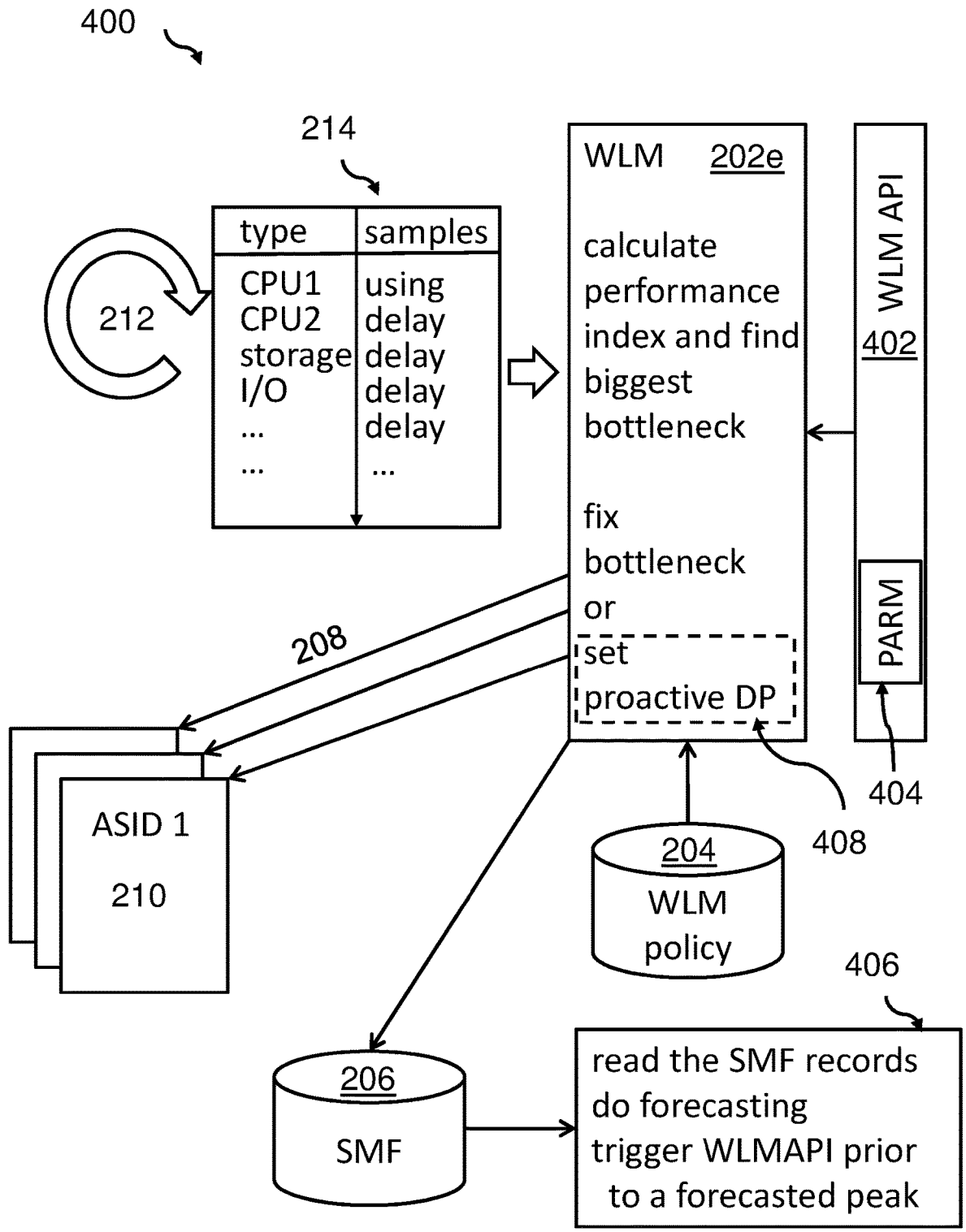
FIG. 4 shows a block diagram of a new workload management architecture and implementation details of a new workflow management system.

FIG. 4 shows a block diagram of a workload management (WLM) architecture 400 and implementation details of some embodiments of a workflow management system. Many of the elements of the existing workload management architecture according to FIG. 2 are also shown here. For these, the same reference numerals are used and not explained again.

The illustrated embodiment of WLM architecture 400 can identify future workload demand by using a time-series analysis algorithm resulting in workload demand time frames and amplitudes of workload based on existing historic data. Thereby, WLM architecture 400 is proactive and can adjust workload priorities by setting a minimum dispatch priority and introducing a protection time and so enhancing the existing priority management (based on measured state) with identified future workload demand expectation. More specifically, resources available to each workload can be reprioritized before the operating system can reactively detect that a workload does not have enough resources available to meet its goals.

The new components of the illustrated embodiment of WLM architecture 400 include a new workload manager application programming interface (API) 402 having at least the service class and the minimum protection time for a dispatch priority as parameters 404. Block 406 symbolizes that the SMF data 206 records are read for forecasting and to trigger the workload manager API prior to a forecasted workload peak demand. Thus, the functionality of the enhanced workload manager 202e is enhanced by setting proactively a new dispatch priority which is indicated by the dashed lines of the block 408.

Figure 5:
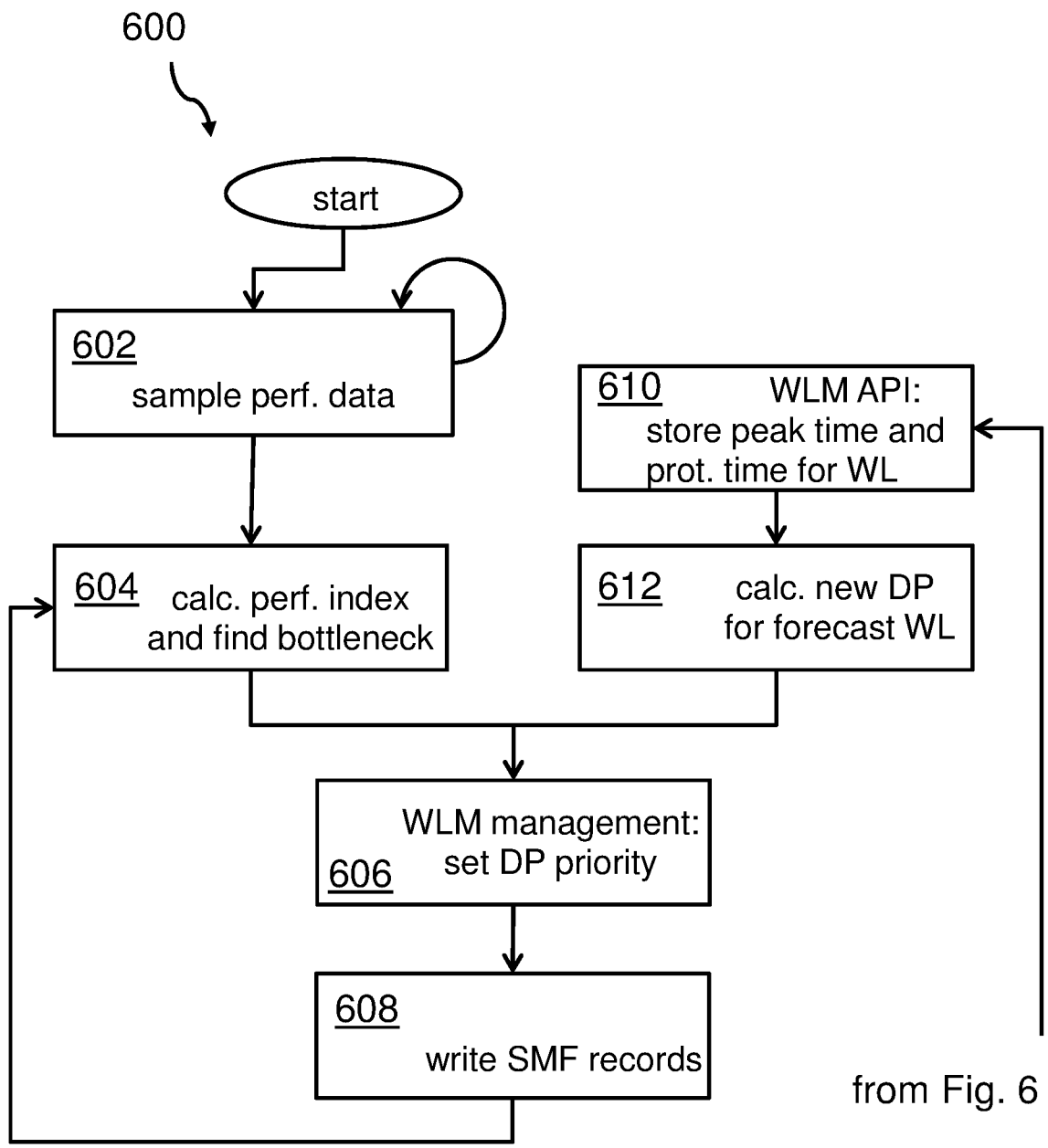
FIG. 5 shows a block diagram of a first part of a more implementation-near flowchart of the method of FIG. 1.

Related logical flow is shown in FIG. 5 as a block diagram of a first part of a more implementation-near flowchart 600 of the proposed method 100 (shown in FIG. 1). The operating system (not shown) continuously logs (e.g., samples, 602) all relevant system data to a log stream, for example, as system management facility data 206. These data, in particular the historic ones, are used for the time-series analysis which predicts the future workload demand for a user defined time frame (e.g., the next day). The method (detailed in FIG. 6) extracts local maxima (e.g., peak demand Δy) occurring at time x2 (shown in FIG. 7) and start of the rising peak demand at time x1 (also shown in FIG. 7).

The process illustrated in FIG. 5 continues with a calculation of a performance index and to find potential bottlenecks, 604. Based on this, the WLM sets, 606, the dispatch priority and writes, 608, these data to the SMF records. This part of the flowchart may also be performed without the enhanced and additional method part of FIG. 6.

In addition to the samples, 602, and calculation, 604 (left side of the flowchart of FIG. 5), the workload manager stores, 610, via the workload manager API, an expected workload peak time and protection time for the dispatch priority for a given workload. This input comes from the flowchart of FIG. 6 and forms the basis for the workload manager to calculate a new dispatch priority for the forecasted workload, 612, and set the protection time for this new dispatch priority.

Figure 6:
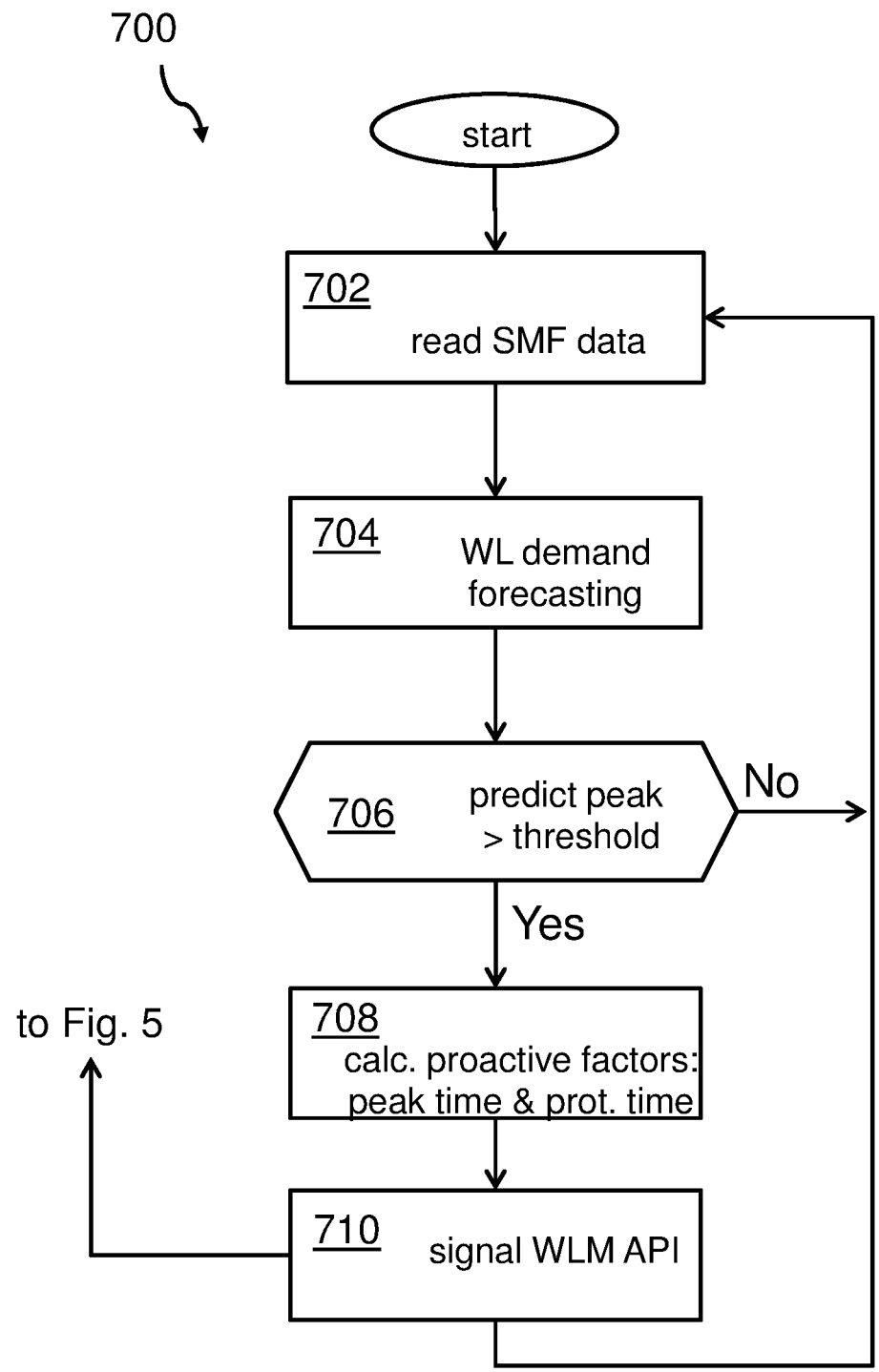
FIG. 6 shows a block diagram of a second part of the more implementation-near flowchart of the method of FIG. 1.

FIG. 6 shows a block diagram of a second part of the more implementation-near flowchart 700 of the disclosed method 100 (shown in FIG. 1). The SMF data are read, 702, and a workload demand forecasting is performed, 704, based on the above-described time-series analysis. If a workload peak is predicted, 706, that is larger than a predefined threshold—a "yes" case—then proactive factors are calculated, 708, as expected peak time and protection time. These results are signaled, 710, to the workload manager API, indicated by the arrow pointing to FIG. 5. The process then loops back to reading SMF data, 702. The process will also loop back to reading SMF data, 702, if the workload peak is smaller than the predefined threshold—a "no" case.

As already indicated, the forecasted peak workload should be above a predefined threshold in order to proceed with calculating, 708, and signaling, 710. Thus, non-significant peaks may be ignored. Such multiple peak demands which may not be significant enough to justify proactive management will not trigger the proactive workload management. Such situations can be handled using traditional means, such as workload management architecture 200 (shown in FIG. 2) which conserves computer resources, time, and energy that would otherwise be used for calculating, 708, and signaling, 710. Thus, the algorithm also introduces a peak threshold α to select significant peaks only. Such a peak threshold α may be set by an operator as a predetermined value or it may be controlled dynamically by system facility.

Figure 7:
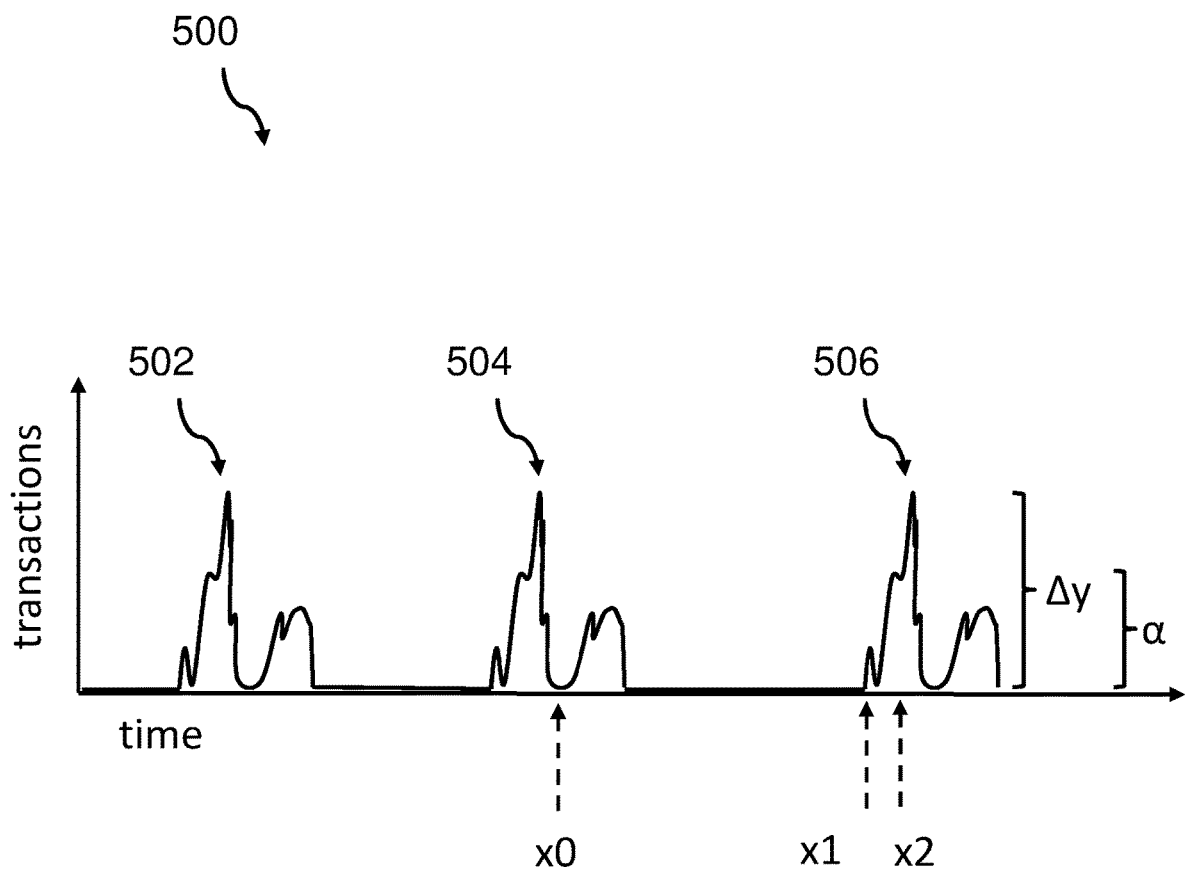
FIG. 7 shows a diagram of a development of workloads over time.

FIG. 7 shows a diagram 500 of a development of workloads development over time. In the illustrated embodiment, Δy symbolizes the peak demand in the form of a number of transactions at time x2, which may exceed the peak threshold α. The x-axis symbolizes the time. The protection time x2−x1 is also calculated. The protection time characterizes the amount of time that this service class needs to receive an increase the dispatch priority. During the protection time, this service class is exempt for receiving a decrease in dispatch priority by the (traditional) reactive workload management process (shown in FIG. 2).

In the illustrated embodiments, workload peaks 502 and 504 symbolize workload peaks in the past, while the workload peak 506 is a forecasted workload peak that is anticipated to happen in the future (for example, in periodic sequence with peaks 502 and 504). A minimum gradient Δy/(x2−x1) is expected and has to be larger than the peak threshold α before the proactive WLM API is called (see 710 of FIG. 6). Because this is true for the busiest portions of peaks 502 and 504, workload peak 506 will be addressed by not allowing the dispatch priority to have a value under a newly calculated minimum dispatch priority value. This rule is set for the protection time (e.g., the time span of x2−x1) starting at the time of x1 of the expected workload peak 506 (or potentially earlier with a correspondingly increased protection time), which is sooner than in traditional approaches.

As previously mentioned, WLM API 402 (shown in FIG. 4) of the present disclosure can adjust the workload priority (i.e., dispatch priority) of a service class in order to proactively allocate more system resources to that service class. This helps that service class to reach its predefined performance goals. In contrast, a traditional, reactive WLM (such as WLM 202, shown in FIG. 2) only assigns more resources if the service class has not reached its goal. The here proposed workload forecasting invokes the WLM API (see 610 of FIG. 5) by providing a parameter list comprising, for example, characters like PactEyeCatcher, PactVersion, PactLength, PactServiceClass, PactProtTime, and PeakTime. These characters are exemplified in the following table:

| Parameter Name | Description |
| --- | --- |
| PactEyeCatcher | "IWM4PACT" - name of the interface |
| PactVersion | interface version |
| PactLength | length of parameter list |
| PactServiceClass | service class with local maximum above α |
| PactProtTime | protection time |
| PeakTime | time when the workload peak is expected |

The WLM API processes incoming requests and stores the protection time and the peak time in an existing WLM data structure for the service class. Thereby, ensuring that the provided service class receives more access to CPU resources (or other resources). This means increasing the dispatch priority of this service class relative to the other service classes in the system.

An additional factor that can determine the access to resources can be a user-defined importance of a service class. In some embodiments, the importance ranges from 1 (high) to 5 (low). A service class with a higher importance receives a higher dispatch priority than a service class with lower importance, for example, a service class $SC_x$ with an importance=2 has a dispatch priority greater than another service class $SC_y$ with an importance=3. Service classes with the same importance may have different dispatch priorities depending on their fulfillment of their pre-defined performance goals.

Therefore, the WLM algorithm can be extended (see 612 of FIG. 5) to determine the new dispatch priority of the input service class by the following formula (I=importance, DP=dispatch priority):

$I_{target}$=determineImportance $(I_{SC})$={if $I$=1, then return 1, or if $I>1$, then return $I_{SC}-1$}.

For a significant dispatch priority increase $DP_{target}$, the algorithm determines the next higher importance level $I_{target}$ if it has not already the highest importance:

$DP_{target}$=determineDP $(I_{SC}, I_{target})$={if $I_{SC}$=1, then maxDP $(I_{target})$+1, or if $I_{SC}>1$, then avgDP $(I_{target})$+1}.

In some embodiments, the new dispatch priority $DP_{target}$ depends on the determined importance $I_{target}$. If the importance of the service class $I_{SC}$ is already 1, then it receives the highest dispatch priority of service classes with importance 1. Otherwise, it receives a dispatch priority equal to the average dispatch priority of service classes with the determined importance $I_{target}$ increased by 1 to ensure that the service class receives enough access to CPU resources (or other resources) due to its higher dispatch priority.

A traditional WLM tries to fix bottlenecks by decreasing the dispatch priority of a service class. In contrast, the extended WLM of the present disclosure marks the service class as protected, so its dispatch priority cannot be decreased during the protection time. In addition, the service class is still able to receive help from a traditional WLM if it is determined as the biggest bottleneck. It may be noted that the formula adapting the DP is used here relating to a service class, whereas the examples relating to embodiments further above relate to an application.

Figure 8:
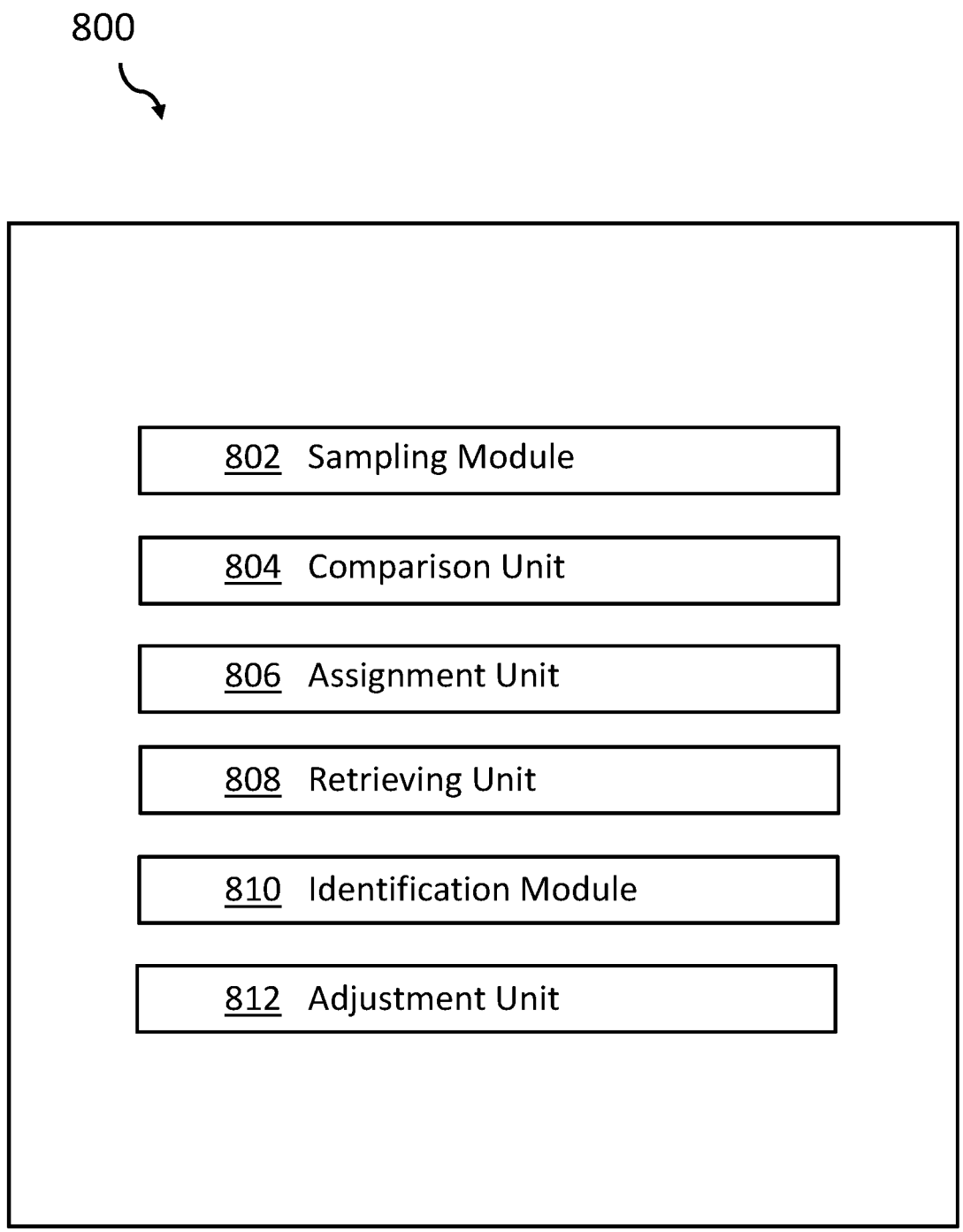
FIG. 8 shows a general block diagram of the workload management system of FIG. 4.

FIG. 8 shows a general block diagram of the proposed enhanced workload management system 800. The system comprises a sampling module 802 adapted for sampling and storing a usage of a resource of the computer system as time-stamped resource usage values, a comparison unit 804 adapted for comparing the sampled resource usage with a predetermined performance goal value, and an assignment unit 806 adapted for assigning a time-stamped priority value to a running application based on the performance goal value. In some embodiments, sampling module 802 is further adapted for applying weighting factors to the time-stamped resource usage values, and assignment unit 806 is further adapted for defining an importance value ($I_{app}$) of said application.

The workload management system 800 comprises further a retrieving unit 808 adapted for retrieving a portion of the time-stamped historic resource usage data and a related portion of historic time-stamped performance goal values for the application, an identification module 810 adapted for identifying a future workload demand value by applying a time-series analysis algorithm to the time-stamped historic resource usage data and the historic time-stamped performance goal values for the application resulting in workload demand time frames and related amplitudes of workloads based, and an adjustment unit 812 adapted for adjusting a dispatch priority value for the application by setting a minimum dispatch priority value for the running application based on the identified future workload demand.

Figure 9:
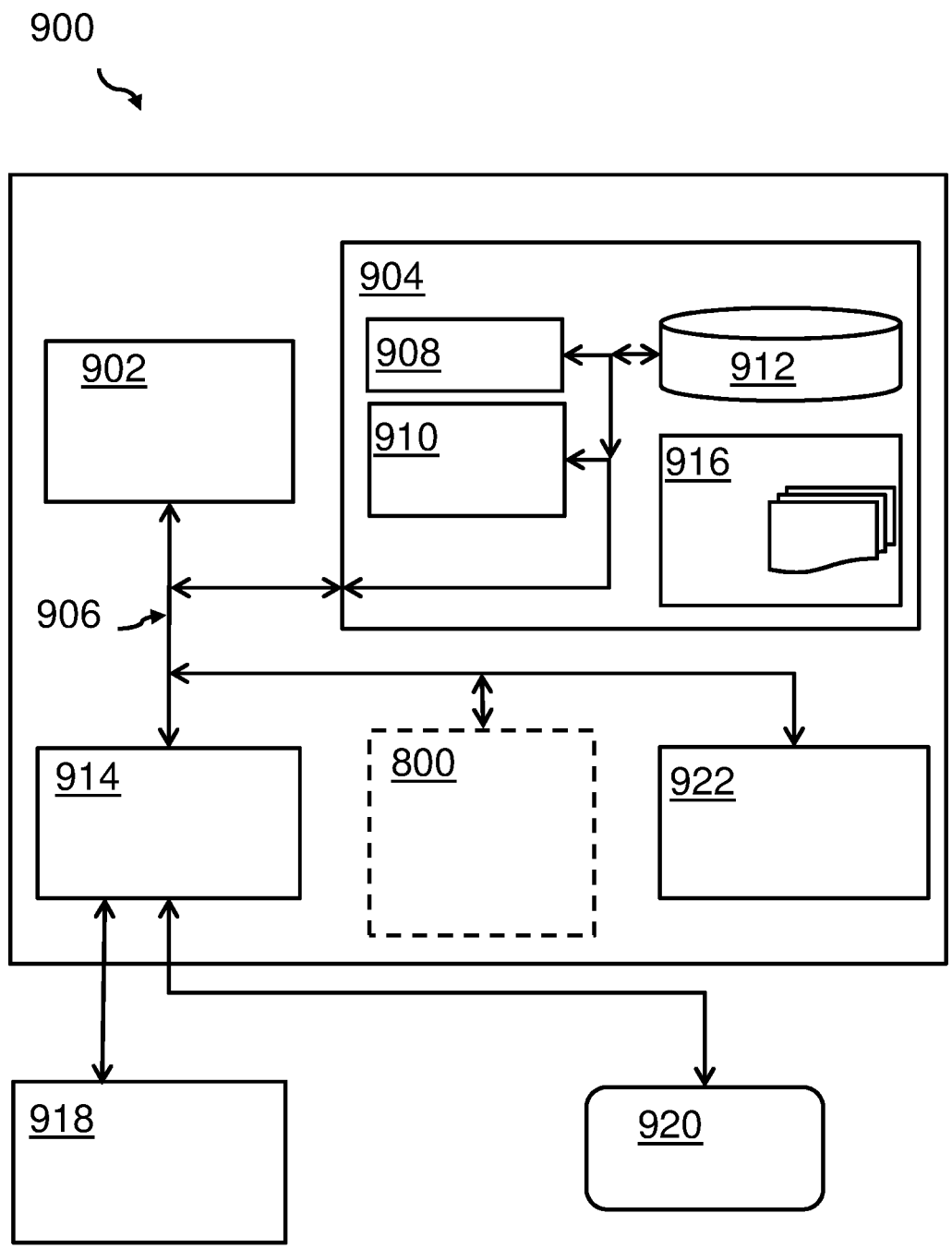
FIG. 9 shows an embodiment of a computing system comprising the workload management system according to FIG. 8.

Embodiments of the disclosure may be implemented together with virtually any type of computer, regardless of the platform being suitable for storing and/or executing program code. FIG. 9 shows, as an example, a computing system 900 suitable for executing program code related to the proposed method.

The computing system 900 is only one example of a suitable computer system, and is not intended to suggest any limitation as to the scope of use or functionality of embodiments of the disclosure described herein, regardless, whether the computer system 900 is capable of being implemented and/or performing any of the functionality set forth hereinabove. In the computer system 900, there are components, which are operational with numerous other general purpose or special purpose computing system environments or configurations. Examples of well-known computing systems, environments, and/or configurations that may be suitable for use with computer system/server 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 900 may be described in the general context of computer system-executable instructions, such as program modules, being executed by a computer system 900. Generally, program modules may include routines, programs, objects, components, logic, data structures, and so on that perform particular tasks or implement particular abstract data types. Computer system/server 900 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 900 is shown in the form of a general-purpose computing device. The components of computer system/server 900 may include, but are not limited to, one or more processors or processing units 902, a system memory 904, and a bus 906 that couple various system components including system memory 904 to the processor 902. Bus 906 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 900 typically includes a variety of computer system readable media. Such media may be any available media that is accessible by computer system/server 900, and it includes both, volatile and non-volatile media, removable and non-removable media.

The system memory 904 may include computer system readable media in the form of volatile memory, such as random access memory (RAM) 908 and/or cache memory 910. Computer system/server 900 may further include other removable/non-removable, volatile/non-volatile computer system storage media. By way of example only, a storage system 912 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 906 by one or more data media interfaces. As will be further depicted and described below, memory 904 may include at least one program product having a set (e.g., at least one) of program modules that are configured to carry out the functions of embodiments of the disclosure.

The program/utility, having a set (at least one) of program modules 916, may be stored in memory 904 by way of example, and not limiting, as well as an operating system, one or more application programs, other program modules, and program data. Each of the operating systems, one or more application programs, other program modules, and program data or some combination thereof, may include an implementation of a networking environment. Program modules 916 generally carry out the functions and/or methodologies of embodiments of the disclosure, as described herein.

The computer system/server 900 may also communicate with one or more external devices 918 such as a keyboard, a pointing device, a display 920, etc.; one or more devices that enable a user to interact with computer system/server 900; and/or any devices (e.g., network card, modem, etc.) that enable computer system/server 900 to communicate with one or more other computing devices. Such communication can occur via Input/Output (I/O) interfaces 914. Still yet, computer system/server 900 may communicate with one or more networks such as a local area network (LAN), a general wide area network (WAN), and/or a public network (e.g., the Internet) via network adapter 922.

As depicted, network adapter 922 may communicate with the other components of computer system/server 900 via bus 906. It should be understood that, although not shown, other hardware and/or software components could be used in conjunction with computer system/server 900. Examples include, but are not limited to: microcode, device drivers, redundant processing units, external disk drive arrays, RAID systems, tape drives, and data archival storage systems, etc. Additionally, system 800 for enhancing a workload manager for a computer having limited resources be attached to the bus system 906.

The descriptions of the various embodiments of the present disclosure have been presented for purposes of illustration and are not intended to be exhaustive or limited to the embodiments disclosed. Many modifications and variations will be apparent to those of ordinary skills in the art without departing from the scope and spirit of the described embodiments. The terminology used herein was chosen to explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limiting of the invention to the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the invention for various embodiments with various modifications, as are suited to the particular use contemplated.

What is claimed is:

1. A computer-implemented method comprising:
    storing usage of a resource of a computer system as time-stamped resource usage values;
    comparing said time-stamped resource usage values with predetermined time-stamped performance goal values;
    assigning a time-stamped priority value to an application that is running based on at least one of said performance goal values;
    identifying a future workload demand value by applying a time-series analysis algorithm to at least some of said time-stamped resource usage values and a corresponding at least some of said time-stamped performance goal values for said application resulting in workload demand time frames and related amplitudes of said workload demand time frames;
    adjusting a dispatch priority value for said application by setting a minimum dispatch priority for said application based on said future workload demand value; and
    granting usage of the resource to said application prior to granting usage of the resource to another application with a lower dispatch priority value.

2. The computer-implemented method of claim 1, further comprising retrieving a portion of said time-stamped resource usage values and a related portion of said time-stamped performance goal values for said application.

3. The computer-implemented method of claim 1, wherein a time period for said portion of said time-stamped resource usage values is selected out of the group consisting of a millisecond, a second, a minute, an hour, a day, a week, a month, a year, two years, three years, four years, five years, and six years.

4. The computer-implemented method of claim 1, further comprising:
    applying weighting factors to said time-stamped resource usage values.

5. The computer-implemented method of claim 1, wherein said setting said minimum dispatch priority further comprises:
    determining periodically, based on said identified future workload demand, an exceeding of a workload threshold growth value; and
    performing said setting said minimum dispatch priority value only if said workload threshold growth value is exceeded.

6. The computer-implemented method of claim 1, wherein said adjusting said dispatch priority value also comprises:
    setting said minimum dispatch priority value such that said dispatch priority value will not be lowered below said minimum dispatch priority value for a fixed period of time.

7. The computer-implemented method of claim 1, wherein said application, said time-stamped resource usage values, and said predetermined performance goal value relate to a service class.

8. The computer-implemented method of claim 1, further comprising:
    defining an importance value ($I_{app}$) of said application.

9. The computer-implemented method of claim 1, wherein adjusting said dispatch priority value depends on an importance value.

10. The computer-implemented method of claim 9, wherein said adjusting said dispatch priority value also comprises:
    adjusting a target importance value ($I_{target}$) according to:
        if $I_{app}=1$, then $I_{target}=1$; and
        if $I_{app}>1$, then $I_{target}=I_{app}-1$, and
    adjusting a target dispatch priority value ($DP_{target}$) according to:
        if $I_{target}=1$, then $DP_{target}=maxDP\ (I_{target})+1$; and
        if $I_{target}>1$, then $DP_{target}=avgDP\ (I_{target})+1$,
    wherein said importance value ($I_{app}$) is a current importance value of said application;
    wherein maxDP is a maximum dispatch priority value assignable to said application; and
    wherein avgDP is an average dispatch priority assignable to said application.

11. A computer system comprising:
    one or more processing devices configured to execute program data for a workload manager system;
    one or more memory devices communicatively and operably coupled to the one or more processing devices, the one or more memory devices storing a storing module, a comparison unit, an assignment unit, an identification module, and an adjustment unit, wherein the program data configures:
        the storing module to store a usage of a resource of said computer system as time-stamped resource usage values;
        the comparison unit to compare said time-stamped resource usage values with predetermined time-stamped performance goal values;
        the assignment unit to assign a time-stamped priority value to an application that is running based on at least one of said time-stamped performance goal values;
        the identification module to identify a future workload demand value by applying a time-series analysis algorithm to at least some of said time-stamped resource usage values and a corresponding at least some of said time-stamped performance goal values for said application resulting in workload demand time frames and related amplitudes of said workload demand time frames;

the adjustment unit to adjust a dispatch priority value for said application by setting a minimum dispatch priority value for said application based on said future workload demand value; and the workload management system to grant usage of the resource to said application prior to granting usage of the resource to another application with a lower dispatch priority value.

12. The computer system of claim 11, wherein the program data further configures:

a retrieving unit to retrieve a portion of said time-stamped resource usage values and a related portion of said time-stamped performance goal values for said application.

13. The computer system of claim 11, wherein a time period for said time-stamped resource usage values is selected out of the group consisting of a minute, an hour, a day, a week, a month, a year, two years, three years, four years, five years, and six years.

14. The computer system of claim 11, wherein the storing unit further applies weighting factors to said time-stamped resource usage values.

15. The computer system of claim 11, wherein said adjustment unit also:

determines periodically, based on said future workload demand value, an exceeding of a workload threshold growth value; and performs said setting of said minimum dispatch priority value only if said workload threshold growth value is exceeded by said future workload demand value.

16. The computer system of claim 15, wherein said adjustment unit also sets said minimum dispatch priority value such that said dispatch priority value will not be lowered below said minimum dispatch priority value for a fixed period of time.

17. The computer system of claim 11, wherein said application, said resource usage values, and said predetermined performance goal value relate to a service class.

18. The computer system of claim 11, wherein the assignment unit also defines an importance value ($I_{app}$) of said application.

19. The computer system of claim 11, wherein the adjustment unit adjusts said dispatch priority value depending on an importance value.

20. A computer program product for enhancing a workload manager for a computer system having limited resources, said computer program product comprising a computer readable storage medium having program instructions embodied therewith, said program instructions being executable by one or more computing systems or controllers to cause said one or more computing systems to:

store a usage of a resource of said computer system as time-stamped resource usage values;

compare said time-stamped resource usage values with predetermined time-stamped performance goal values;

assign a time-stamped priority value to an application that is running based on at least one of said time-stamped performance goal values;

identify a future workload demand value by applying a time-series analysis algorithm to at least some of said time-stamped resource usage values and a corresponding at least some of said time-stamped performance goal values for said application resulting in workload demand time frames and related amplitudes of workload demand time frames;

adjust a dispatch priority value for said application by setting a minimum dispatch priority value for said application based on said future workload demand value; and grant usage of the resource to said application prior to granting usage of the resource to another application with a lower dispatch priority value.

* * * * *